(12) United States Patent
Dal Zotto et al.

(10) Patent No.: US 12,347,235 B2
(45) Date of Patent: Jul. 1, 2025

(54) ESTABLISHING PRIVATE COMMUNICATION CHANNELS

(71) Applicant: Hewlett-Packard Development Company, L.P., Spring, TX (US)

(72) Inventors: Rafael Dal Zotto, Porto Alegre (BR); Gareth Westlake, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 195 days.

(21) Appl. No.: 18/001,588

(22) PCT Filed: Jun. 24, 2020

(86) PCT No.: PCT/US2020/039441
§ 371 (c)(1),
(2) Date: Dec. 12, 2022

(87) PCT Pub. No.: WO2021/262164
PCT Pub. Date: Dec. 30, 2021

(65) Prior Publication Data
US 2023/0230416 A1    Jul. 20, 2023

(51) Int. Cl.
*G06F 3/01* (2006.01)
*G06V 40/18* (2022.01)
*H04N 7/14* (2006.01)

(52) U.S. Cl.
CPC ............ *G06V 40/197* (2022.01); *G06F 3/013* (2013.01); *H04N 7/147* (2013.01)

(58) Field of Classification Search
CPC ....... G06V 40/197; G06F 3/013; H04N 7/147
See application file for complete search history.

(56) References Cited

U.S. PATENT DOCUMENTS

| | | | |
|---|---|---|---|
| 6,466,250 B1 | 10/2002 | Hein et al. | |
| 9,438,819 B2 | 9/2016 | Van Broeck | |
| 10,360,894 B1 | 7/2019 | Rakshit et al. | |
| 10,572,005 B2 | 2/2020 | Zahn et al. | |
| 2015/0085056 A1* | 3/2015 | Van Broeck | G06F 3/013 348/14.1 |
| 2018/0034867 A1* | 2/2018 | Zahn | G06F 3/011 |
| 2018/0157321 A1 | 6/2018 | Liu | |
| 2019/0391637 A1 | 12/2019 | Taylor et al. | |
| 2021/0377062 A1* | 12/2021 | Stevens | H04N 7/157 |

OTHER PUBLICATIONS

Nexgsd, "Sidebar—Beyond Video Meetings," retrieved from: nexgsd.org/research/case-stories/sidebar/, retrieved on: May 8, 2020, pp. 2.

* cited by examiner

Primary Examiner — Amal S Zenati
(74) Attorney, Agent, or Firm — Quarles & Brady LLP

(57) ABSTRACT

Examples are described herein for establishing private communication channels. In various examples, camera-acquired eye tracking data if participants in a first video conference call may be monitored. Based on the monitoring, it may be determined that gazes of a subset of the participants collectively satisfy a criterion, wherein the subset includes a plurality of the participants in the first video conference call. In response to the determining that the gazes of the subset of participants collectively satisfy the criterion, a private second video conference call between the plurality of the participants is established.

18 Claims, 4 Drawing Sheets

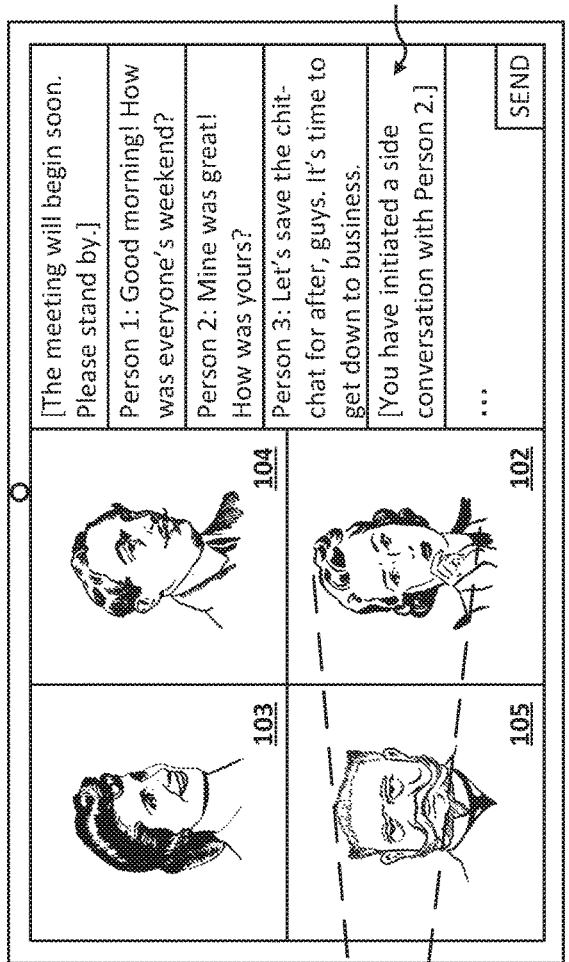
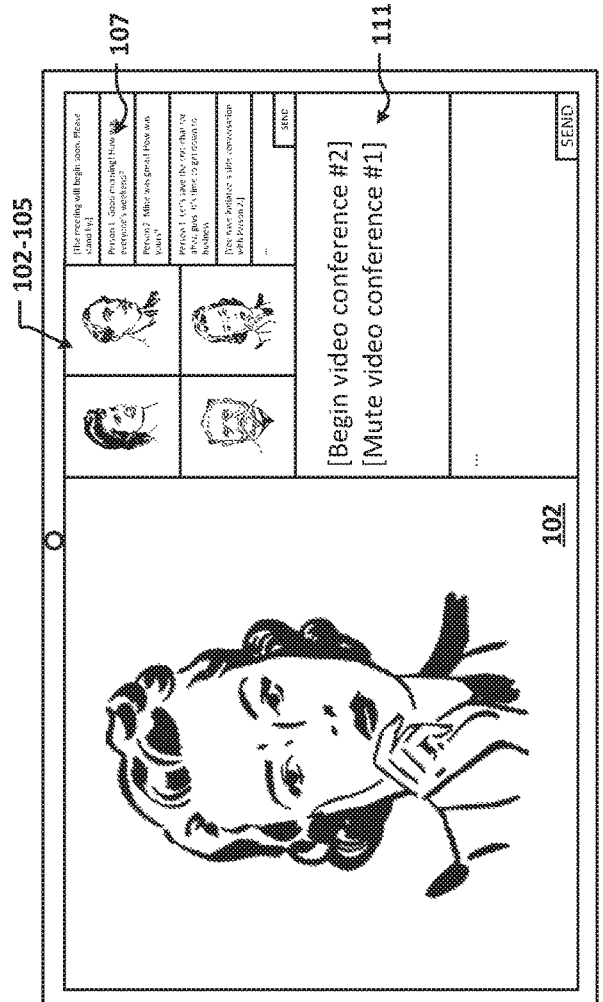
Fig. 1A
Fig. 1B

ESTABLISHING PRIVATE COMMUNICATION CHANNELS

BACKGROUND

Virtual communication technologies such as video conferences and shared virtual environments allow multiple participants to interact with each other using various input/output modalities. For example, video conference calls enable participants distributed across multiple different locations to interact with each other visually and audibly, e.g., by way of webcams operated by the participants. Most video conference applications—and more generally, shared virtual environment applications (e.g., video games)—enable participants to see visual representations of other participants. These visual representations may be live video streams of the other participants, static digital photographs of the other participants, and/or avatars (still or animated) corresponding to the other participants.

BRIEF DESCRIPTION OF THE DRAWINGS

Features of the present disclosure are illustrated by way of example and not limited in the following figure(s), in which like numerals indicate like elements, FIGS. 1A-1B illustrate an example of establishing a second, private video conference call between a subset of participants of a first video conference call based on the detected gazes of the participants, in accordance with an example of the present disclosure.

DETAILED DESCRIPTION

Figure 2:
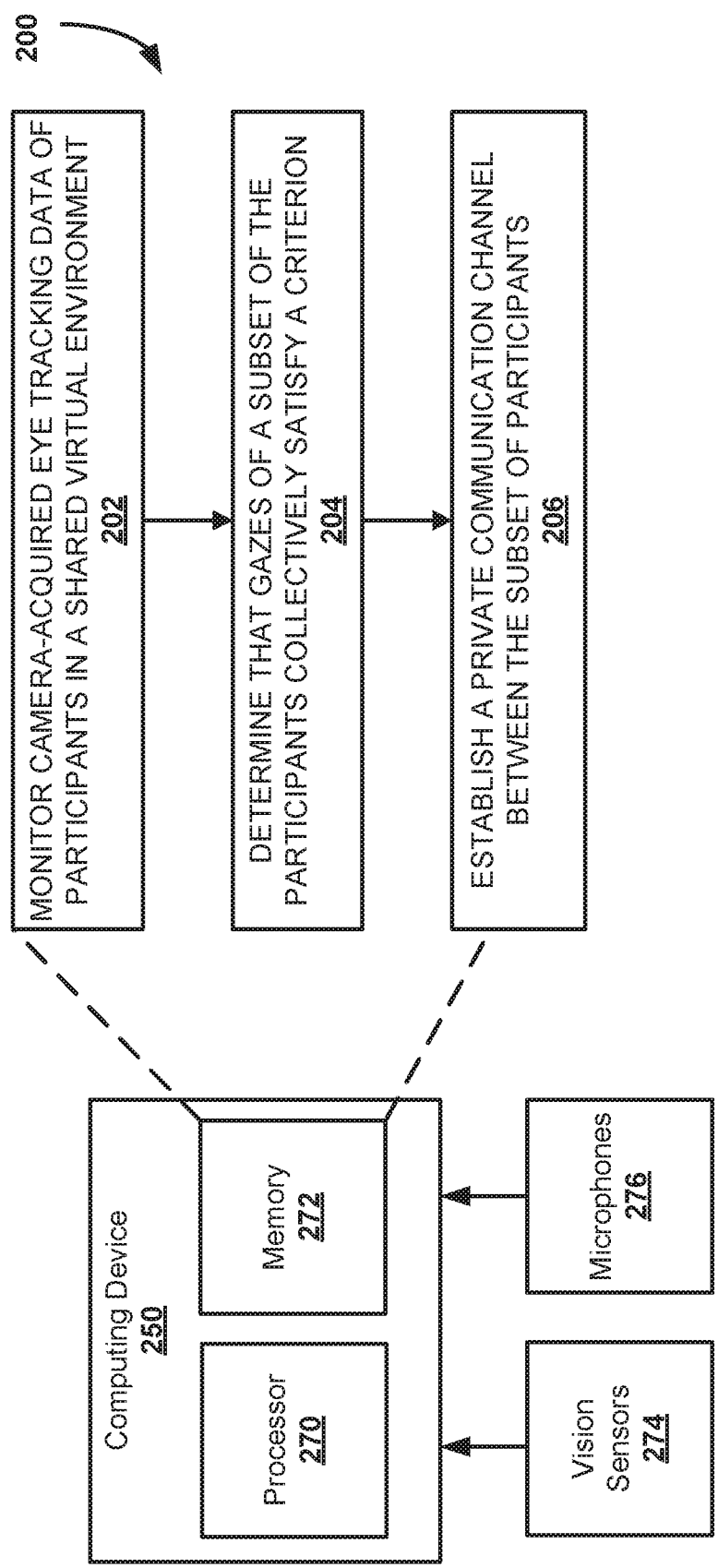
FIG. 2 schematically depicts a block diagram of an example computing device embodying selected aspects of the present disclosure.

For simplicity and illustrative purposes, the present disclosure is described by referring mainly to various examples thereof. In the following description, numerous specific details are set forth in order to provide a thorough understanding of the present disclosure. However, examples consistent with the present disclosure may be practiced without limitation to these specific details. In other instances, some methods and structures have not been described in detail so as not to unnecessarily obscure the present disclosure.

The elements depicted in the accompanying figures may include additional components and that some of the components described in those figures may be removed and/or modified without departing from scopes of the elements disclosed herein. The elements depicted in the figures are not drawn to scale and the elements may have different sizes and/or configurations other than as shown in the figures.

Virtual communications technologies enable enhanced options to meet with clients, working colleagues, friends and family. Examples described herein relate to facilitating, e.g., in a shared virtual environment such as a video conference, a common behavior that occurs during physical face-to-face meetings: side conversations or "sidebars." During face-to-face meetings, while inside a meeting room, attendees can engage in side-conversations to get clarifications or discuss specific points, without interrupting the active speaker. Techniques are described herein for facilitating direct communication channels in between two participants in a shared virtual environment such as a video conference, based on visual attention detection, without impact on other participants.

FIGS. 1A-1B illustrate an example of establishing a second, private video conference call between a subset of participants of a first video conference call based on the detected gazes of the participants, in accordance with an example of the present disclosure.

In FIG. 1A, a graphical user interface ("GUI") 130 illustrates a communication channel between a participant 101 and two or more additional users in the form of a first video conference call. The video conference call may occur, for example, through a video conference calling application. During the first video conference call, GUI 130 represents the two or more additional participants graphically in the form of graphical representations 102, 103, 104, 105. Graphical representations 102-105 may include, for instance, live video streams, avatars (still or animated), digital photographs, etc.

The computing device (not depicted) that renders GUI 130 may include an integral vision sensor, such as a camera, to capture vision data including a live video stream of the participant 101 and/or a gaze 106 of the participant 101. In some examples, the vision sensor may be separate from but in remote communication with the computing device of the participant 101. For example, the vision sensor may be integral with a virtual reality ("VR") headset or pair of augmented reality ("AR") smart glasses communicatively coupled to the computing device that renders GUI 130. The computing device may also include a microphone for capturing audio data including speech of the participant 101. The other participants may be operating similar computing devices (rendering respective GUIs similar to GUI 130) and peripherals to capture live video streams and/or gazes of those participants.

The GUI 130 may also include a section 107 with a graphical representation of a "chat interface" of the video conference call. This section 107 may include system management messages, system notifications, system prompts, and textual or graphical messages sent and received among the participants of the first video conference call.

Once the computing device that renders GUI 130 joins the first video conference call, the vision sensor included in or in communication with the computing device will begin detecting vision data of the participant 101, including detecting the gaze 106 direction of the user. The gaze 106 direction of the user will then be compared with the layout of the graphical representations 102, 103, 104, 105 of the additional participants in the first video conference call. Likewise, the additional computing devices of the additional users will detect respective gaze directions of the additional users and compare them to respective graphical representations of the other participants of the first video conference call.

When it is determined that gazes of a subset that includes a plurality of the participants collectively satisfy a criterion, a private second video conference call may be established between the participants of the subset. For example, the gazes of multiple users, such as participant 101 and the additional user associated with graphical representation 102, may be considered as "overlapping temporally" when the gaze 106 direction of participant 101 is determined to match the position of the graphical representation 102 of the additional user on the GUI and when the gaze direction of that additional user is determined to match the position of a corresponding graphical representation of the participant 101 on the GUI of the additional user's computing device.

In FIG. 1B a private, second video conference call is established between the participant 101 and the additional user represented by graphical representation 102 once it is determined that their respective gazes satisfy a criterion by overlapping temporally. As shown in the GUI 130 of the participant 101, the GUI elements representing the "chat interface" 107 and the graphical representations 102-105 of the first video conference call may be rendered in a manner that is less conspicuous than the graphical representation 102 and a "chat interface" 111 of the second, private video conference call. For example, the GUI elements of the first vide conference call may be reduced in size, minimized in a different window, or overlaid by and in comparison to the GUI elements of the private, second video conference call.

During the second, private video conference call, the audio data of the live audio streams of the first video conference call may be muted or the volume may be lowered such that the participant 101 and the additional user associated with graphical representation 102 will not be distracted by the audio of the first video conference call. Additionally, the audio data including the speech of the participant 101 and the participant represented by graphical representation 102 will be audible in the private, second video conference call and may be muted in the first video conference call. Thus, the other participants of the first video conference call will not be able to hear the conversations of the participant 101 and the additional participant associated with graphical representation 102 during their private, second video conference call.

Once the participant 101 and the additional participant are finished with their second, private video conference call, one of or both of the participants may end the second, private video conference call by providing a "close" indication in the GUI of the second, private video conference call. When a participant ends the second, private video conference call, both the participant 101 and the additional participant associated with graphical representation 102 will be returned to the GUI 130 of the first video conference call, as shown in FIG. 1A. The audio streams of the first conference call will then be unmuted or returned to their regular volume and the audio streams of the participant 101 and the additional participant associated with graphical representation 102 will be transmitted to the other participants of the first video conference call in the same manner as before they initiated their second, private video conference call.

FIG. 2 schematically depicts a block diagram of an example computing device 250 embodying selected aspects of the present disclosure. The computing device 250 depicted in FIG. 2 may take various forms, such as: a desktop computing device, a laptop computing device, a tablet computing device, a mobile phone computing device, a video conferencing system server, a virtual environment gaming server, a virtual reality experience server, a multiplayer online game server, and/or a wearable apparatus of a user that includes a computing device (e.g., a watch of the user having a computing device, glasses of the user having a computing device, a virtual or augmented reality computing device). Various other client computing devices may be provided.

Computing device 250 includes a processor 270 and memory 272 storing instructions that, when executed, cause the processor to perform method 200. Computing device 250 may additionally be communicatively coupled with vision sensors 274 of the participants in a shared virtual environment or, in some cases, may be communicatively coupled to the computing devices of the participants in the shared virtual environment and may receive vision data acquired from those computing devices. The vision data may in some examples include eye tracking data indicating a gaze direction of respective participant(s). In some cases, the video data capturing a respective participant may be incorporated into a live video stream of that respective participant.

Likewise, computing device 250 may be communicatively coupled with microphones 276 of the participants in the shared virtual environment, or may receive audio data from the computing devices of the participants. The audio data may include speech of the users and any sounds picked up by the microphones in the surrounding environments of the users. Where applicable, the audio data generated by a participant may be incorporated into a video stream for that participant.

Referring to FIG. 2, method 200 begins with monitoring camera-acquired eye tracking data of the participants in a shared virtual environment 202. Various eye tracking techniques and devices may be employed. In various examples, various techniques such as techniques that search for features in the participant's eye and/or attempt to obtain a best fit may be employed. In some examples, vision data captured by a camera is analyzed using a training machine learning model, such as a convolutional neural network. In some examples, hardware specifically designed to analyze vision data and generate eye tracking data may be employed as well, e.g., as part of computing device 250 or separately. In yet other examples, other techniques may be employed to generate and/or obtain eye-tracking data, such as by processing one or both of visible and invisible (e.g., infrared, near infrared) vision data.

The shared virtual environment may be, for instance, a multiplayer online video game that includes graphical avatar representations of the participants. As another non-limiting example, the shared virtual environment may be a shared video conferencing environment where each participant is provided with a GUI (e.g., 130) that includes graphical representations of the participants, as disclosed in more detail with respect to FIGS. 1A-1B.

Monitoring the camera-acquired eye tracking data of the participants in the shared virtual environment at 202 may include analyzing the eye tracking data of each participant as he or she interacts with the shared virtual environment to determine a gaze direction of the respective participant. The gaze direction of the respective participant may then be compared with the graphical representations of the other participants displayed on the user interface of the participant's computing device.

At 204, based on the monitoring, it is then determined that the gazes of a subset of the participants in the shared virtual environment collectively satisfy a criterion.

The gazes of a subset of the participants in the shared virtual environment may collectively satisfy a criterion 204 when, for instance, it is determined that a first gaze of a first participant of the subset of participants is directed at a graphical representation of a second participant of the subset and that a second gaze of the second participant is directed at a graphical representation of the first participant. In some cases, the criterion may be satisfied when the first and second gazes overlap temporally, i.e. the first participant is staring at the graphical representation of the second participant at the same time or during the same time period that the second participant is staring at the graphical representation of the first participant. In some cases, the criterion may be satisfied when the first and second gazes overlap temporally for a threshold amount of time, such as three seconds. This threshold amount of time may or may not be adjustable by participants.

In some cases, the criterion may be satisfied when it is further determined that neither the first nor second participant began speaking within a predetermined time interval of the temporal overlap of the first and second gazes. Intuitively, when two people give each other a meaningful gaze, e.g.; from across the room, that may be interpreted by those people as a signal that they would like to engage in a private discussion.

In some examples, the criterion may be satisfied when it is determined that a threshold number or percentage of additional participants in the first video conference call are not also gazing at the graphical representations of the first or second participants during the temporal overlap, and/or that a threshold number or percentage of additional participants in the first video conference did not contemporaneously redirect their gazes at the graphical representations of the first or second participants during the temporal overlap. For example, if a main speaker ceases speaking to allow a different participant to address the group (e.g.; an audience member to ask a question), the rest of the participants would likely look at that different participant all at once. And yet, in this situation it wouldn't make sense to establish multiple private communications channels between everyone else and this different participant. Thus, in some cases, the criterion may serve to prevent needless initiation of private communication channels between various subsets of the participants when one or a small number of participants who are currently acting as speakers or performers meant to be viewed and/or listened to by all participants happens to gaze at the avatar or video feed of another participant.

In some cases, when a first gaze of a first participant is directed at a graphical representation of a second participant but a second gaze of the second participant is not directed at the graphical representation of the first participant, the criterion will not be determined to have been satisfied. Even though the criterion of 204 is not satisfied, in some examples, the second participant may be notified in some way that the first participant wants to establish a private communication channel. For example, the second participant may be presented with a graphical icon on their GUI overlaid on the graphical representation of the first participant to represent that the first participant is attempting to get the second participant's attention to establish a private communication. As another example, the second participant may be presented with a prompt to confirm establishing a private communication channel with the first participant and the private communication channel will be established if the second participant responds affirmatively. In some cases, the length of time that a first participant's gaze overlaps with the graphical representation of the second participant in order to trigger such a notification and/or prompt to the second participant may be greater than the length of time for both participants' gazes to overlap to establish the private communication channel automatically, without first prompting or notifying the second participant.

Referring back to FIG. 2, at 206, in response to determining that the gazes of the subset of the participants collectively satisfied a criterion at 204, a private communication channel between the subset of participants may be established. Establishing a private communication channel between the subset of participants may include, for instance, generating a private video conference that is shared between the subset of participants. This private video conference may be visually overlaid on top of the shared virtual environment, may be displayed instead of the shared virtual environment, and/or may be embedded in the shared virtual environment, e.g., may supplement or replace the graphical elements of the shared virtual environment. In some cases, the private video conference may be audio, audio-visual, may allow for sharing of content such as a document or participant desktop, etc.

While the private communication channel is established at block 206, the participants in the private communication channel may share their audio, their video, their graphical avatar, and/or some combination of these elements with the other participants in the private communication channel. In some examples they may be able to share other content, such as their desktops, documents, applications, streaming media, etc. While the private communication channel is established, the audio, video, content, desktop, and/or avatar data of the participants will be shared with the other participants in the private communication channel but not with participants in the shared virtual environment who are not on the private communication channel. Other participants of the shared virtual environment who are not included in the subset of users on the private communication channel will not be able to perceive the communications exchanged in the private communication channel. Additionally, the audio of other participants of the shared virtual environment not included in the subset may be muted or have the volume lowered so as to not distract the participants in the private communication channel from their private communications.

When users of the subset are finished with their private communication channel and/or private video conference, they may close their connection to the private communication channel. When one participant is left with access to the private communication channel, their connection to the private communication channel may be automatically closed. In some cases, once a threshold amount of time has passed without detecting voice input from any participants of the subset, the private communication channel may be automatically closed.

Once a user's connection to the private communication channel has been closed, the audio, video, and/or avatar data of the participants of the private communication channel will no longer be accessible to them. Additionally, the audio, video, and/or avatar data of the participants of the first virtual shared environment will once again be displayed prominently and/or have its volume increased.

Figure 3:
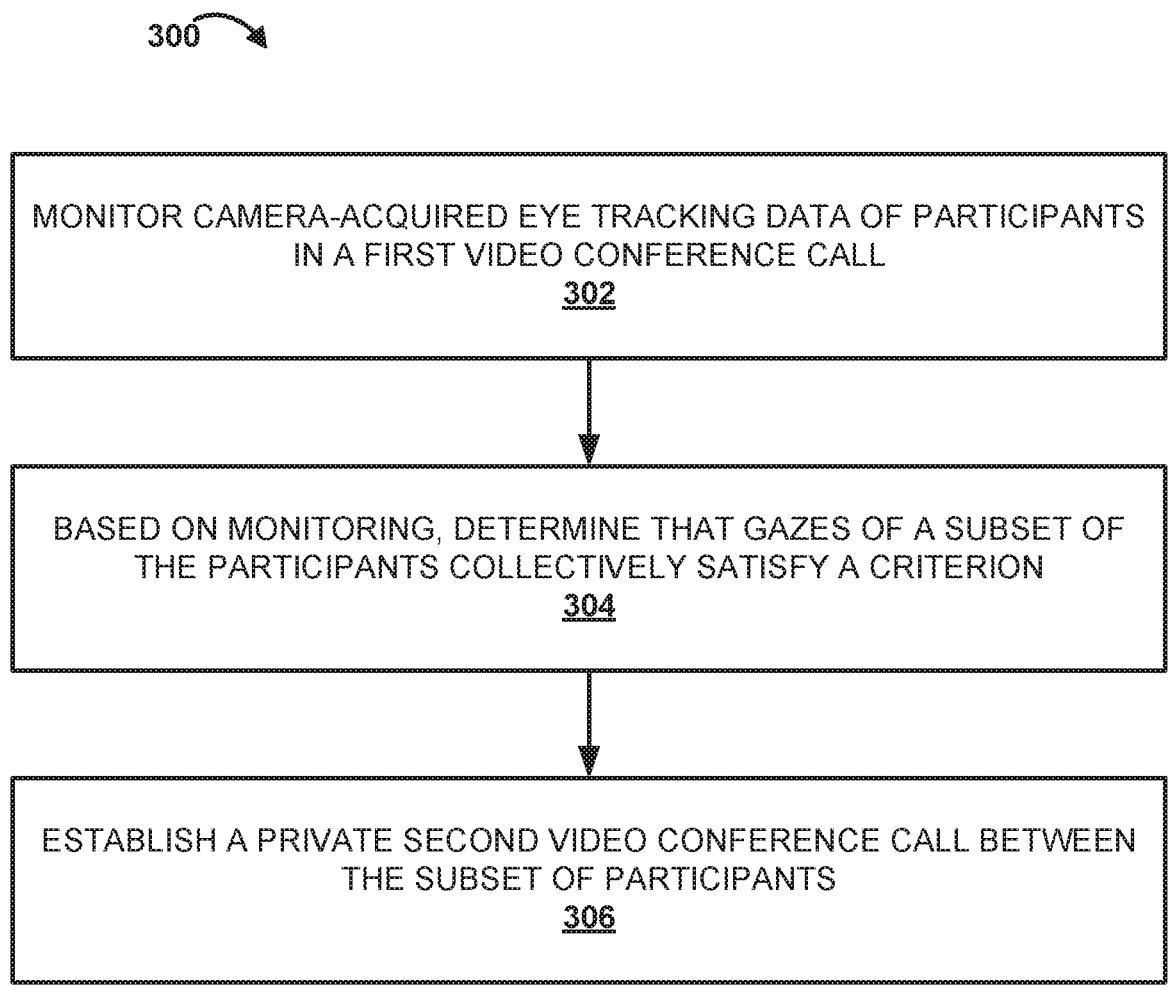
FIG. 3 is a flow diagram that illustrates an example method for establishing a private second video conference call between a subset of participants to a first video conference call based on the gazes of the subset of participants, in accordance with an example of the present disclosure.

FIG. 3 is a flow diagram that illustrates an example method 300 for establishing a private second video conference call between a subset of participants to a first video conference call based on the gazes of the subset of participants, in accordance with an example of the present disclosure. Method 300 may be implemented by various computing devices described herein.

Method 300 may occur during a first video conference call between three or more participants. During the first video conference call, all participants may choose to share video and/or audio data of themselves and then all shared video and/or audio data may be perceived by all participants to the first video conference call. For example, all participants may share live video streams via cameras associated with their computing devices and live audio streams via microphones associated with their computing devices. In some cases, some participants may choose to share their audio stream but not their video stream and, in such a case, those participants may be represented by graphical icons or avatars in the GUIs of the other participants rather than by live video streams.

Method 300 may begin with the monitoring camera-acquired eye tracking data of the participants of the first video conference call 302. As discussed above with respect to FIGS. 1 and 2, cameras associated with computing devices of the participants may provide the vision data that can then be processed using eye tracking processing to generate eye tracking data. The eye tracking data may be used to determine gaze directions of the participants at any given moment. The gaze directions of the participants may then be cross-referenced with the graphical representations of the other participants to the first video conference call that are visible on the GUIs of the participants. Thus, by monitoring the eye tracking data of the participants and cross-referencing gaze directions with GUI elements, it may be determined at which GUI elements the participants are gazing.

Based on determining the gazes of the participants, it is then determined at 304 that the gazes of a subset of the participants collectively satisfy a criterion, where the subset of participants includes a plurality of the participants to the first video conference call. As discussed above with respect to FIG. 2, the criterion may include gazes overlapping temporally and/or gazes overlapping temporally for a threshold time interval.

Also as discussed above with respect to FIG. 2, the criterion may, in some examples, include that a number of additional participants in the first video conference did not contemporaneously redirect their gazes at the graphical representations of the subset of participants whose gazes overlapped during the time period of the overlap, that none of the subset of participants began speaking within a predetermined time interval of the temporal overlap, and/or that a threshold number or percentage of additional participants in the first video conference call were not also gazing at the graphical representations of the subset of participants during the time period of the overlap. These criteria may ensure that a main speaker of a video conference call does not inadvertently initiate secondary private conference calls with each participant that they look at, since most all participants would be expected to be gazing at the main speaker. These also ensure that a participant whom everyone expects to begin speaking momentarily, for instance when they are being prompted with a question and are expected to answer shortly, does not inadvertently start private calls with those who look to him just before he begins speaking.

At 306, in response to determining that gazes of a subset of the participants collectively satisfy a criterion, a private second video conference call between the subset of participants is established. Establishing a private second video conference call may comprise modifying, overlaying, or replacing the GUI of the first video conference call with a GUI of the private second video conference call, providing the subset of participants with live video streams and/or GUI representations of the subset of participants, providing the participants with live audio streams of the subset of participants, muting or lowering the audio of the other participants to the first video conference call, and/or ending live video stream sharing of the subset of participants with the other participants of the first video conference call. In some examples, the private second video conference call may be established through a secure communications channel that other participants of the first video conference call may not access. In some cases, the participants of the subset may first be prompted to establish a private second video conference call. In such cases, the participants of the subset will have to provide responsive input to the prompt in order to establish a connection to the private second video conference call.

Figure 4:
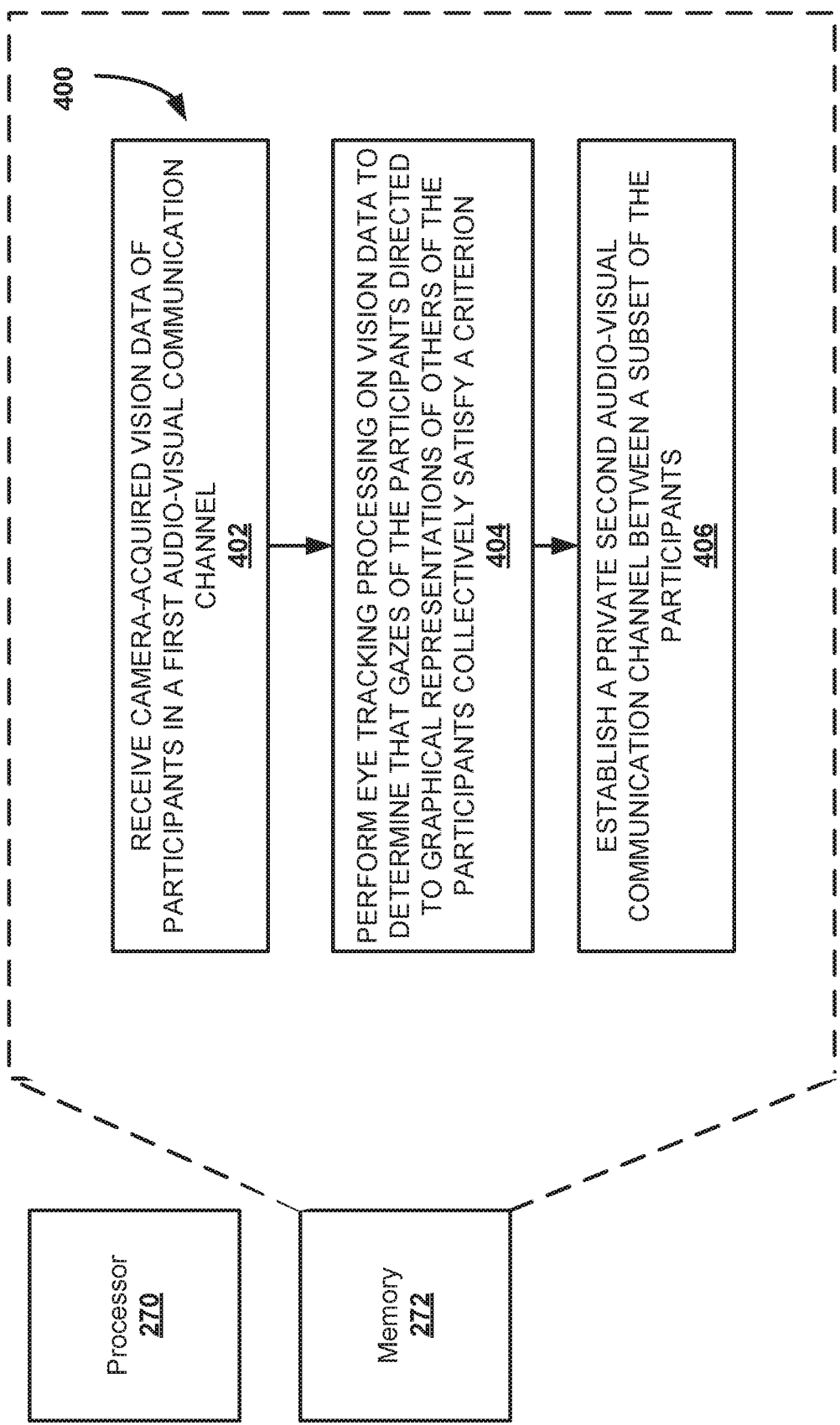
FIG. 4 illustrates an example system performing an example process, in accordance with an example of the present disclosure.

FIG. 4 illustrates an example system performing an example process 400, in accordance with an example of the present disclosure. The system of FIG. 4 includes a processor 270 and memory 272 storing instructions that, when executed, perform the process 400. Process 400 may be performed by a video conference calling application server, a multiplayer online game server, or by multiple servers or other computing devices communicating with one another to perform process 400.

When connected to the first audio-visual communication channel, all participants may share audio and/or video data with the other participants on the channel, as well as other content such as documents (e.g., slideshows), computer desktop environments, etc. The audio and/or video data may comprise live speech of a participant, live video of a participant, and/or an animated or still video game avatar of a participant. Participants may be provided with a GUI (e.g., 130) that includes graphical representations associated with the audio and/or video data of the other participants. For example, participants may be presented with a GUI such as the one shown in FIG. 1A in which graphical representations 102, 103, 104, 105 of other participants may be provided along with live audio streams of the other participants. As another example, participants may see other participants represented as multiplayer online game avatars on their GUI.

Process 400 begins with receiving camera-acquired vision data of participants in a first audio-visual communication channel 402. An example audio-visual communication channel may be in the form of a video conference calling application or a multiplayer online game, Even when participants are not sharing a live video stream with other participants, the system performing process 400 will still receive camera-acquired vision data of the participants for purposes of analyzing participant gaze directions at any given moment.

At 404, eye-tracking processing of the vision data is performed to determine that the gazes of the participants in the first audio-visual communication channel that are directed to graphical representations of other participants collectively satisfy a criterion. For example, the vision data may be processed to determine which graphical representations a given participant is gazing by identifying the given participant's eye movements, eye movement durations, and/or orientation with respect to the GUI. A gaze direction of the participant is determined based on the eye movements and their orientation with respect to the GUI of their computing device. In various examples, the gaze direction is cross-referenced with the GUI elements, including the graphical representations of the other participants that are presented to that participant. Once it is determined which participants are gazing at which graphical representations of other participants during a given time period, the gazes of those users are compared to a criterion. Example criteria were described previously.

At 406, in response to determining that the gazes of the participants that are directed to the graphical representations of other participants collectively satisfy the criterion, a private second audio-visual communication channel between a subset of the participants may be established. As described previously. The private second audio-visual communication channel may be a secure communication channel that is not accessible to participants in the first audio-visual communication channel who are not of the subset. Therefore, participants of the first audio-visual communication channel who are not of the subset who are participating in the private second audio-visual channel may not be able to hear and/or see the audio and video representations of the subset of participants while they are still participating in the private second audio visual communication channel.

As discussed above with respect to FIGS. 1A-1B, 2, and 3, the GUI of the second audio-visual communication channel may be overlaid, embedded in, or displayed instead of the GUI of the first audio-visual communication channel until a given participant closes that GUI and returns to the GUI of the first audio-visual communication channel. Also as discussed above with respect to FIGS. 1A-1B, 2, and 3, the audio of the first audio-visual communication channel may be muted or lowered in volume for the subset of participants when the private second audio-visual communication channel is established and returned to normal volume after it is closed by the participant. Additionally, in some cases, the participants of the subset may each be prompted to provide their approval before establishing the private second audio visual communication channel. In such cases, the private second audio visual communication channel may then be established once all prompted users provide their approval.

It shall be recognized, in light of the description provided, that the elements and procedures described above may be implemented in a computer environment using hardware, computer-readable instructions, firmware, and/or combinations of these. Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What is claimed is:

1. A method implemented using a processor and comprising:
    monitoring camera-acquired eye tracking data of a plurality of participants in a first video conference call;
    based on the monitoring, determining that gazes of a subset of the plurality of participants collectively satisfy a criterion, wherein the subset includes a first participant and a second participant of the plurality of the participants in the first video conference call, and wherein the gazes of the subset of the plurality of participants collectively satisfy the criterion when a first gaze of the first participant of the subset is directed at the graphical representation of the second participant of the subset while a second gaze of the second participant is directed at the graphical representation of the first participant and a number of additional participants in the first video conference call did not contemporaneously redirect their gazes at the graphical representations of the first or second participants; and
    in response to the determining:
        establishing a private second video conference call between the first participant and the second participant.

2. The method of claim 1, wherein the private second video conference call is usable to share a desktop of the first participant with the second participant.

3. The method of claim 1, wherein the criterion is satisfied when the first and second gazes overlap temporally.

4. The method of claim 3, wherein determining that the gazes of the subset collectively satisfy the criterion further includes determining that the number of additional participants in the first video conference call did not contemporaneously redirect their gazes at the graphical representations of the first or second participants during the temporal overlap.

5. The method of claim 3, wherein determining that the gazes of the subset collectively satisfy the criterion further includes determining that neither the first nor second participant begins speaking within a predetermined time interval of the temporal overlap.

6. The method of claim 1, wherein the criterion is satisfied when the first and second gazes overlap temporally for a threshold time interval.

7. The method of claim 1, wherein determining that the gazes of the subset collectively satisfy the criterion further includes determining that a threshold number or percentage of additional participants in the first video conference call are not also gazing at the graphical representations of the first or second participants.

8. The method of claim 1, further comprising:
    generating a graphical user interface of a communication channel between the plurality of participants of the first video conference call, each participant represented with a respective graphical representation; and
    wherein establishing the private second video conference call between the first participant and the second participant includes modifying an element of the graphical user interface associated with the first video conference call.

9. The method of claim 8, wherein modifying the element of the graphical user interface includes modifying at least one of a respective graphical representation of a participant excluded from the private second video conference call; or a chat interface of the first video conference call.

10. The method of claim 1, further comprising:
    in response to the private second video conference call ending, increase the volume of the first video conference call.

11. The method of claim 1, wherein establishing the private second video conference call between the subset comprises causing computing devices operated by the first participant and the second participant to end live video stream sharing with a computing device operated by a third participant of the plurality of participants that is excluded from the private second video conference call while the first participant and the second participant participate in the private second video conference call.

12. The method of claim 1, further comprising:
    in response to the determining, causing computing devices operated by the subset of the plurality of participants to lower a volume of the first video conference call.

13. A system comprising a processor and memory, wherein the memory stores computer-readable instructions that, in response to execution by the processor, cause the processor to:
    receive camera-acquired vision data of participants in a first audio-visual ("AV") communication channel;
    perform eye tracking processing on the vision data to determine that gazes of the participants directed to graphical representations of others of the participants collectively satisfy a criterion; and
    based the determination that the gazes of the participants collectively satisfy the criterion, establish a private second AV communication channel between a subset of the participants,
    wherein the gazes of the participants collectively satisfy the criterion when a first gaze of a first participant of the subset is directed at the graphical representation of a second participant of the subset while a second gaze of the second participant is directed at the graphical representation of the first participant and a number of additional participants in the first AV communication channel did not contemporaneously redirect their gazes at the graphical representations of the first or second participants.

14. The system of claim 13, wherein the private second AV communication channel is established further based on a determination that:
   an overlapping time interval during which the first gaze is directed at the graphical representation of the second participant and the second gaze is directed at the graphical representation of the first participant satisfies a threshold time interval;
   neither the first participant nor the second participant speaks within a predetermined time interval of the overlapping time interval; or
   the number of additional participants in the first AV communication channel did not contemporaneously redirect their gazes at the graphical representations of the first participant or the second participant during the overlapping time interval.

15. The system of claim 13, further comprising instructions to cause computing devices operated by the subset of the participants to render output that prompts each participant in the subset for approval to establish the private second AV communication channel, wherein the private second AV communication channel is established responsive to receipt of approval from each participant in the subset.

16. A non-transitory computer-readable medium comprising instructions that, in response to execution of the instructions by a processor, cause the processor to:
   monitor camera-acquired eye tracking data of participants in a shared virtual environment that includes graphical representations of other participants in the shared virtual environment;
   based on the monitoring, determine that gazes of a subset of the participants collectively satisfy a criterion, wherein the subset includes a plurality of the participants in the shared virtual environment, and wherein the gazes of the subset of the participants collectively satisfy the criterion when a first gaze of a first participant of the subset is directed at the graphical representation of a second participant of the subset while a second gaze of the second participant is directed at the graphical representation of the first participant and a number of additional participants in the shared virtual environment did not contemporaneously redirect their gazes at the graphical representations of the first or second participants; and
   in response to the determining:
      establish a private communication channel between the subset of the participants.

17. The non-transitory computer-readable medium of claim 16, wherein the shared virtual environment comprises a multiplayer online game, and the graphical representations comprise avatars in the multiplayer online game.

18. The non-transitory computer-readable medium of claim 16, wherein the processor is to:
   in response to the determining:
   cause computing devices operated by the subset of the participants to adjust a volume of participants in the shared virtual environment that are excluded from the private communication channel.

* * * * *